(12) United States Patent
Ito (10) Patent No.: US 6,335,072 B1
(45) Date of Patent: Jan. 1, 2002

(54) NON-TRUE-CIRCULAR OPTICAL DISK

(76) Inventor: Tomoaki Ito, 4-2-3-104, Shiginonishi, Jotoku, Osakashi, 536-0014 (JP)

( * ) Notice: Subject to any disclaimer, the term of this patent is extended or adjusted under 35 U.S.C. 154(b) by 0 days.

(21) Appl. No.: 09/540,867

(22) Filed: Mar. 31, 2000

(30) Foreign Application Priority Data

Mar. 31, 1999 (JP) .......................................... 11-092399

(51) Int. Cl.$^7$ ................................................. B32B 3/02
(52) U.S. Cl. ..................... 428/64.1; 428/64.4; 428/195; 430/270.11
(58) Field of Search ............................... 428/64.1, 64.2, 428/64.4, 913, 195; 430/270.11, 495.1, 945

(56) References Cited

FOREIGN PATENT DOCUMENTS

| DE | 196 07 565 A1 | 7/1997 |
| DE | 297 09 648 U1 | 1/1998 |
| DE | 297 14 719 U1 | 11/1998 |
| JP | 5-12720 | 1/1993 |
| JP | 10-269628 | 10/1998 |
| WO | WO 99/16062 | 4/1999 |

*Primary Examiner*—Elizabeth Evans
(74) *Attorney, Agent, or Firm*—Armstrong, Westerman, Hattori, McLeland & Naughton, LLP (57) ABSTRACT

A non-true-circular optical disk includes a disk substrate which internally touches a hypothetical true-circle corresponding to an outer periphery of a true-circular optical disk of a certain standard size. The disk substrate has a non-true-circular contour corresponding to a configuration shaped such that at least one cut-out portion is formed at an outer periphery of the hypothetical true-circle to thereby enhance a design. The disk substrate includes at least one inscribed outer peripheral edge internally touching the hypothetical true-circle. The aforementioned at least one inscribed outer peripheral edge includes a plurality of positioning points meeting a geometrical positional relationship by which a rotational center of the disk substrate coincides with a center of the hypothetical true-circle and a movement of the rotational center relative to the center of the hypothetical true-circle is prevented in a state that the at least one inscribed outer peripheral edge internally touches the hypothetical true-circle.

23 Claims, 4 Drawing Sheets

NON-TRUE-CIRCULAR OPTICAL DISK

BACKGROUND OF THE INVENTION

1. Field of the Invention

This invention relates to an optical disk such as a CD and a DVD, and more particularly, to an optical disk having a non-true-circular contour.

2. Description of Related Art

Figure 8:
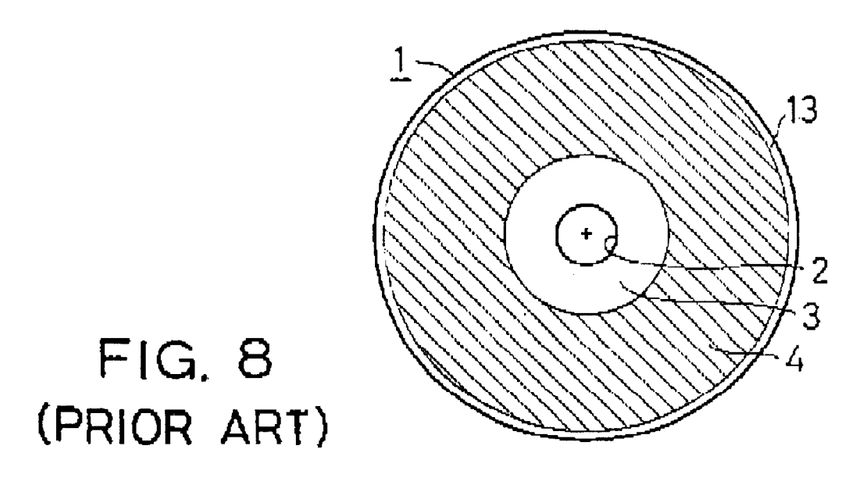
FIG. 8 is a plan view showing a conventional true-circular optical disk.

As shown in FIG. 8, a conventional optical disk 1, which is generally used as a data-recording medium, has a true-circular contour. This kind of optical disk 1 has a ring-shaped clamping region. 3 having a central aperture 2, a wide ring-shaped data-recording region 4 provided outside the clamping region 3, and a very narrow transparent peripheral region 13 provided at the outermost peripheral edge of the disk, A reflection layer is provided to the optical disk 1 so as to correspond to the ring-shaped data-recording region 4.

On the other hand, Japanese Unexamined Laid-open Patent Publication NO. 5-012720 A discloses an optical disk having a cut-out portion in the outer periphery asymmetrically about a radial direction of between the top and reverse surfaces so that a visually handicapped person can easily recognize the top or reverse surface. However, since the cut-out portion is merely formed at the aforementioned very narrow outermost transparent peripheral region of the disk, the overall configuration of the disk is still recognized as a true-circular based shape, Furthermore, Japanese Unexamined Laid-open Patent Publication No. 10-269628 A (hereinafter referred to as JP' 628) discloses an optical disk having a linear edge portion formed at a part of the peripheral region of the disk for easy positioning of a label. However, this optical disk also has a true-circular contour shape except for the linear edge portion and that the linear edge portion is formed at the very narrow outermost transparent peripheral region. Therefore, although a part of the outer peripheral edge is cut-out, the overall configuration of the disk is still recognized as a true-circular based shape, which fails to provide an effective designs.

In the meantime, JP' 628 points out the following drawbacks regarding a non-circular optical disk: (1) Since a non-circular optical disk has a specific configuration, it becomes impossible to be taken out of a slot-in type car-stereo or a jukebox; (2) In a caddy type or a tray type player, a non-circular disk cannot be appropriately clamped, resulting in an unable reproduction of the data; and (3) Since a non-circular disk has an irregular weight balance, a heavy load may be imparted to a disk driver. Therefore, it cannot be used for a high-speed CD-ROM driver.

In considering the aforementioned drawbacks, JP' 628 proposes that the reflection layer is provided so as to form a specific shape other than a true-circular shape irrespective of the circular reflection layer to enhance the design by the configuration of the reflection layer.

However, since this disk still has a true-circular based shape, the contour of the disk itself fails to provide any interesting design.

SUMMARY OF THE INVENTION

The present invention is made in view of the aforementioned technical drawbacks.

It is an object of the present invention to provide a practical optical disk which can be correctly clamped by a tray type disk driver although the disk has a non-true-circular shape.

According to one aspect of the present invention, a non-true-circular optical disk includes a disk substrate which internally touches a hypothetical true-circle corresponding to an outer periphery of a true-circular optical disk of a certain standard size. The disk substrate has a non-true-circular contour corresponding to a configuration shaped such that at least one cut-out portion is formed at an outer periphery of the hypothetical true-circle to thereby enhance a design. The disk substrate includes at least one inscribed outer peripheral edge internally touching the hypothetical true-circle. Furthermore, the aforementioned at least one inscribed outer peripheral edge includes a plurality of positioning points. The plurality of positioning points meet a geometrical positional relationship by which a rotational center of the disk substrate coincides with a center of the hypothetical true-circle and a movement of the rotational center relative to the center of the hypothetical true-circle is prevented in a state that the aforementioned at least one inscribed outer peripheral edge internally touches the hypothetical true-circle.

With this nun-true-circular optical disk, since the disk has a non-true-circular contour, the disk can provide an interesting design by the specific configuration of the non-true-circular contour which is different from that of a conventional trues circular or true-circular-based disk. Furthermore, even when a user places the non-true-circular disk onto a disk carrying tray having no positioning axis, the disk can be appropriately centered on the tray, resulting in an assured clamping of the disk by a disk driver.

If the aforementioned at least one cut-out portion is formed at an inside region beyond a narrow outermost transparent peripheral region with no reflection layer generally provided at a true-circular optical disk, the design effect can be further enhanced.

According to a second aspect of the present invention, the disk substrate includes three or more inscribed outer peripheral edges internally contacting the hypothetical true-circle, wherein the three or more inscribed outer peripheral edges include three or more positioning points, and wherein the three or more positioning points are positioned such that a total of a rotational-center-side interior angle of each triangle formed by segments connecting adjacent two positioning points and the rotational center becomes 360 degrees.

According to a third aspect of the present invention, the disk substrate includes three or more inscribed outer peripheral edges internally contacting the hypothetical circle, wherein the three or more inscribed outer peripheral edges include three or more positioning points, and wherein the three or more positioning points are positioned such that adjacent two positioning points are positioned on the hypothetical true-circle in a circumferential direction thereof at arcuate intervals each not exceeding a half circumference length of the hypothetical true-circle.

The aforementioned inscribed outer peripheral edge may inwardly contact the hypothetical true-circle at a point or in a line.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENTS

Non-true-circular optical disks according to the preferred embodiments of the present invention will be explained with reference to the drawings.

Figure 1:
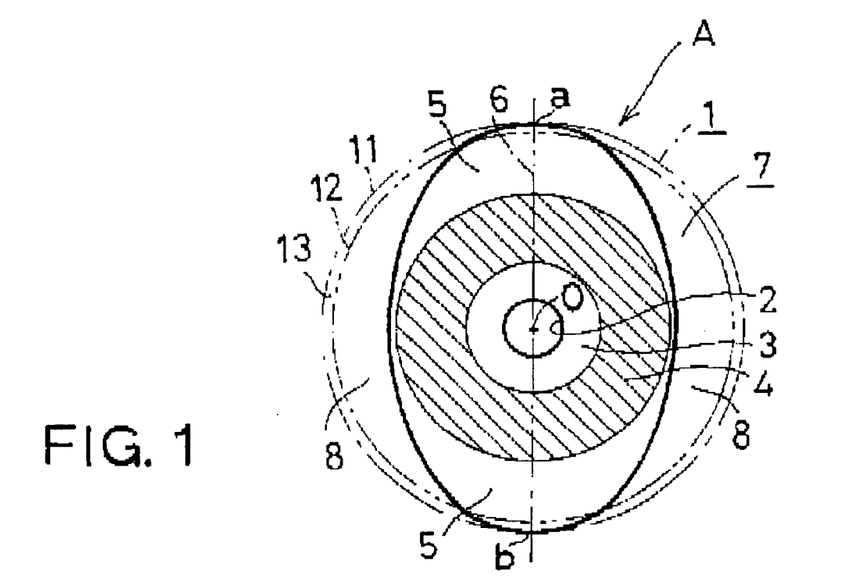
FIG. 1 is a plan view showing a non-true-circular optical disk having two inscribed outer peripheral edges according to a first embodiment of the present invention.

FIG. 1 shows a first embodiment of the present invention.

The optical disk A is comprised of a disk substrate having a flat circular shape which is fitted in a hypothetical true-circle 1 corresponding to a 12 cm CD (compact disk) 7. In detail, the optical disk A has a clamping region 3 having a center aperture 2, a ring-shaped data-recording region 4 formed outside the clamping region 3 and a pair of data-non-recording regions 5 radially outwardly protruded from the data-recording regions 4 in opposite directions. The data-non-recording regions 5 are formed so as to be symmetric with respect to a straight line 6 shown in FIG. 1. In other words, the disk substrate has a flat circular shape having out-out portions 8 at opposite outer peripheral portions of the hypothetical true-circle 1. Thus, the outer peripheral configuration of the disk A is completely different from that of a conventional true-circular disk, which provides an interesting original design.

Needless to say, the aforementioned cut-out portions 8 should be formed at a data-non-recording region 7 located outside the data-recording region 4. The data-recording region 4 of this embodiment is formed to have an outer diameter smaller than that of a data-recording region of a conventional true-circular optical disk 1 shown in FIG. 8, so that cut-out portions can be formed at the region outside the data-recording region 4. This will be also applied to each of the following embodiments.

The aforementioned each protruded data-non-recording region 5 has an inscribed outer peripheral edge which inwardly contacts the hypothetical true-circle 1 at a point, The plants of these inscribed outer peripheral edges each contacting the hypothetical true-circle 1 constitute positioning points a, b.

As shown in FIG. 1, these positioning points a, b are located at intersections of the straight line 6 shown in FIG. 1 and the hypothetical true-circle 1. In other words, the line segment ab connecting the positioning points a, b corresponds to a diameter of the hypothetical true-circle 1. Therefore, these two positioning points a, b meet a geometrical positional relationship by which a rotational center O of the disk substrate coincides with the center of the hypothetical true-circle 1 and a movement of the rotational center O relative to the center of the hypothetical true-circle 1 is prevented in a state that the two inscribed outer peripheral edges internally touch the hypothetical true-circle 1.

Therefore, the non-true-circular optical disk A according to this embodiment can he centered in a circular dented portion of a disk carrying tray of a disk driver (not shown) by simply placing the disk A in the dented portion. Furthermore, in this state, the disk A is never shifted from the center of the disk carrying tray (not shown). Accordingly, the clamping of the non-true-circular optical disk A by a disk driver can be performed correctly.

The non-true-circular optical disk A is formed to be symmetric with respect to the aforementioned straight line 6, resulting in an excellent weight balance. Therefore, the disk A can be suitably used as a CD-ROM of a high-speed reading type.

Figure 2:
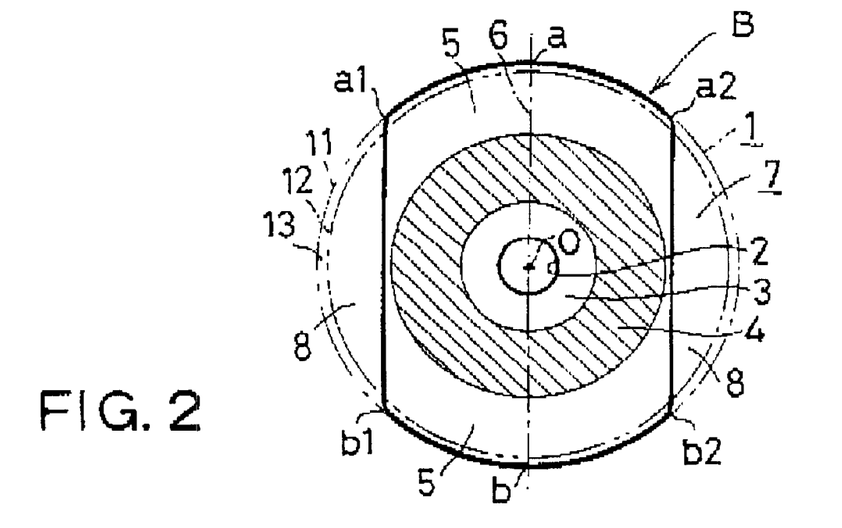
FIG. 2 is a plan view showing a non-true-circular optical disk having two inscribed outer peripheral edges according to a second embodiment of the present invention.

FIG. 2 shows a non-true-circular optical disk B according to a second embodiment of the present invention.

The optical disk B has an outer peripheral configuration shaped such that a hypothetical true-circle 1 corresponding to a true-circular optical disk 7 is cut by a pair of straight lines parallel to the straight line 6 shown in FIG. 1. The optical disk B has a clamping region 3 having a center aperture 2, a ring-shaped data-recording region 4 formed outside the clamping region 3 and a pair of data-non-recording regions 5 radially outwardly protruded from the data-recording region 4 in opposite directions. In this embodiment too, the cut-out portions 8 are formed so as to remain the data-recording region 4.

The aforementioned each protruded data-non-recording region 5 has an inscribed outer peripheral edge which inwardly contacts the hypothetical true-circle 1 in a line. In this embodiment, as shown in FIG. 2, for example, the two intersections of these inscribed outer peripheral edges and the straight line E constitute positioning points a, b.

The line segment ab connecting the positioning points a, b corresponds to a diameter of the hypothetical true-circle 1. Therefore, these two positioning points a, b meet a geometrical positional relationship by which a rotational center O of the disk substrate coincides with the center or the hypothetical true-circle 1 and a movement of the rotational center O relative to the center of the hypothetical true-circle 1 is prevented in a state that the two inscribed outer peripheral edges internally touch the hypothetical true-circle 1.

In this embodiment, other than the aforementioned positioning points a, b, there are another positioning points which meet the geometrical positional relationship by which a rotational center O of the disk substrate coincides with the center of the hypothetical true-circle 1 and a movement of the rotational center O relative to the center of the hypothetical true-circle 1 is prevented in a state that the two inscribed outer peripheral edges internally touch the hypothetical true-circle 1. For example, as shown in FIG. 2, the left and right ends a1, a2 of the upper inscribed outer peripheral edge as well as the left and right ends b1, b2 of the lower inscribed outer peripheral edge also constitute the aforementioned positioning points.

Therefore, the non-true-circular optical disk B according to this embodiment can be centered in a circular dented portion of a disk carrying tray of a disk driver (not shown) by simply placing the disk B in the dented portion. Furthermore, in this state, the disk B is never shifted from the center of the disk carrying tray (not shown). Accordingly, the clamping of the non-true-circular optical disk B by a disk driver can be performed correctly.

The non-true-circular optical disk B is formed to be symmetric with respect to the aforementioned straight line 6, resulting in an excellent weight balance. Therefore, the disk B can also be suitably used as a CD-ROM of a high-speed reading type.

Figure 3:
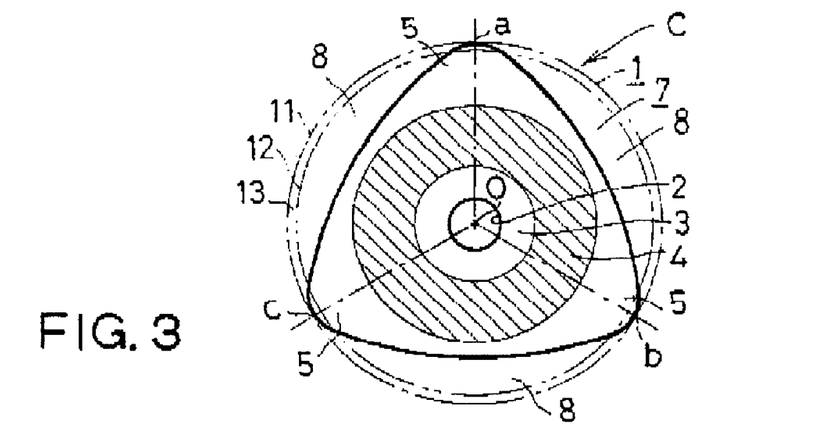
FIG. 3 is a plan view showing a non-true-circular optical disk having three inscribed outer peripheral edges according to a third embodiment of the present invention.

FIG. 3 shows a non-true-circular optical disk C according to a third embodiment of the present invention.

The non-true-circular optical disk C has an outer peripheral configuration shaped such that an outer circumference edge of a hypothetical true-circle 1 corresponding to a true-circular optical disk 7 is arcuately cut in 120 degree phase difference. Thus, the optical disk C has a clamping region 3 having a center aperture 2, a ring-shaped data-recording region 4 formed outside the clamping region 3 and three data-non-recording region 5 radially outwardly protruded from the data-recording region 4 in 120 degree phase difference. In this embodiment too, the cut-out portions 8 are formed so as to remain the data-recording region 4.

The aforementioned each protruded data-non-recording region 5 has an inscribed outer peripheral edge which inwardly contacts the hypothetical true-circle 1 in a point. In this embodiment, as shown in rig. 3, the three inscribed outer peripheral edges inwardly contacting the hypothetical true-circle 1 constitute positioning points a, b, c.

The line segments connecting the adjacent positioning points a, b, a correspond to an equilateral triangle inwardly touching the hypothetical true-circle 1. Therefore, these positioning points a, b, c meet a geometrical positional relationship by which a rotational center O of the disk substrate coincides with the center of the hypothetical true-circle 1 and a movement of the rotational center O relative to the center of the hypothetical true-circle 1 is prevented in a state that the two inscribed outer peripheral edges internally touch the hypothetical true-circle 1. In other words, a total of a rotational-center-side interior angle (∠aob, ∠boc and ∠coa) of each triangle (Δaob, Δboc and Δcoa) formed by segments connecting adjacent two positioning points and the rotational center O becomes 360 degrees. Furthermore, in other words, the adjacent two positioning points are positioned on the hypothetical true-circle 1 in a circumferential direction thereof at arcuate intervals ab, bc, ca each not exceeding a half circumference length of the hypothetical true-circle 1.

Therefore, the non-true-circular optical disk C according to this embodiment can be centered in a circular dented portion of a disk carrying tray of a disk driver (not shown) by simply placing the disk C in the dented portion. Furthermore, in this state, the disk C is never shifted from the center of the disk carrying tray (not shown). Accordingly, the clamping of the non-true-circular optical disk C by a disk driver can be performed correctly.

The non-true-circular optical disk C is formed to be symmetric with respect to a straight lines connecting any one of positioning points with the rotational center O, resulting in an excellent weight balance. Therefore, the disk C can also be suitably used as a CD-ROM of a high-speed reading type.

Figure 4:
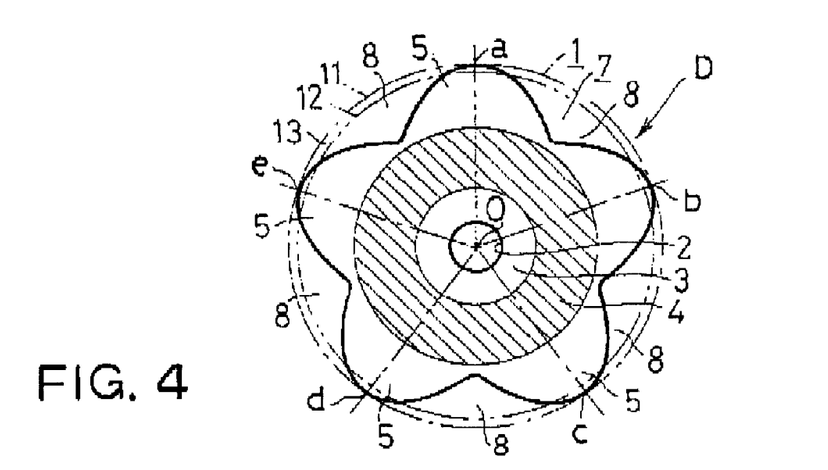
FIG. 4 is a plan view showing a non-true-circular optical disk having five inscribed outer peripheral edges according to a fourth embodiment of the present invention.

FIG. 4 shows a non-true-circular optical disk D according to a fourth embodiment of the present invention.

The non-true-circular optical disk D has an outer peripheral configuration shaped such that an outer circumference edge of a hypothetical true-circle 1 corresponding to a true-circular optical disk 7 is cut in 72 degree phase difference. Thus, the optical disk D has a clamping region 3 having a center aperture 2, a ring-shaped data-recording region 4 formed outside the clamping region 3 and five data-non-recording regions 5 radially outwardly protruded from the data-recording region 4 in 72 degree phase difference. In this embodiment too, the cut-out portions 8 are formed so as to remain the data-recording region 4.

The aforementioned each protruded data-non-recording region 5 has an inscribed outer peripheral edge which inwardly contacts the hypothetical true-circle 1 in a point. In this embodiment, as shown in FIG. 4, the five inscribed outer peripheral edges inwardly contacting the hypothetical true-circle 1 constitute positioning points a, b, c, d, e.

The line segments connecting the adjacent positioning points a, b, c, d, e correspond to an equilateral pentagon inwardly touching the hypothetical true-circle 1, Therefore, these positioning points a, b, c, d, e meet a geometrical positional relationship by which a rotational center O of the disk substrate coincides with the center of the hypothetical true-circle 1 and a movement of the rotational center O relative to the center of the hypothetical true-circle 1 is prevented in a state that the two inscribed outer peripheral edges internally touch the hypothetical true-circle 1. In other words, a total of a rotational-center-side interior angle (∠aob, ∠boc, ∠cod, ∠doe and ∠eoa) of each triangle (Δaob, Δboc, Δcod, Δdoe, Δeoa) formed by segments connecting adjacent two positioning points and the rotational center O becomes 360 degrees. Furthermore, in other words, the adjacent two positioning points are positioned on the hypothetical true-circle 1 in a circumferential direction thereof at arcuate intervals ab, bc, cd, de, ea each not exceeding a half circumference length of the hypothetical true-circle.

Therefore, the non-true-circular optical disk D according to this embodiment can be centered in a circular dented portion of a disk carrying tray of a disk driver (not shown) by simply 25 placing the disk D in the dented portion. Furthermore, in this state, the disk D is never shifted from the center or the disk carrying tray (not shown). Accordingly, the clamping of the non-true-circular optical disk D by a disk driver can be performed correctly.

This non-true-circular optical disk D is formed to be symmetric with respect to a straight line connecting any one of positioning points with the rotational center O, resulting in an excellent weight balance. Therefore, the disk D can also be suitably used as a CD-ROM of a high-speed reading type.

Figure 5:
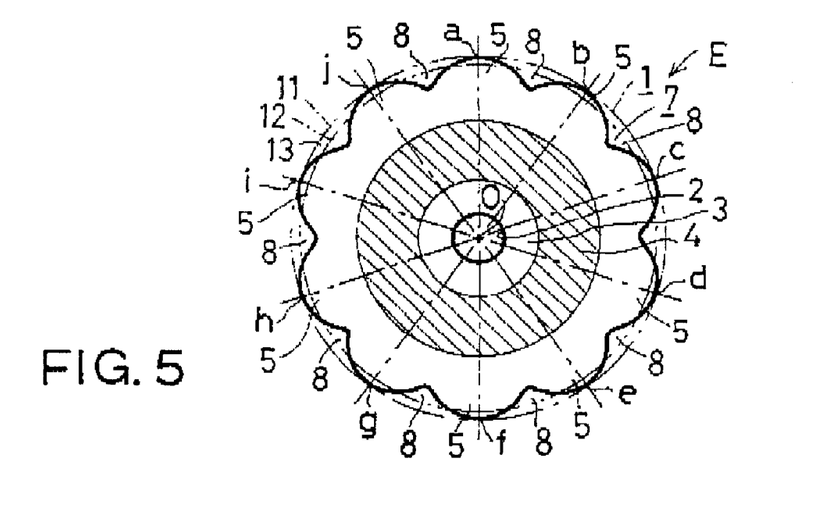
FIG. 5 is a plant view showing a non-true-circular optical disk having ten inscribed outer peripheral edges according to a fifth embodiment of the present invention.

FIG. 5 shows a non-true-circular optical disk E according to a fifth embodiment of the present invention.

The non-true-circular optical disk E has a plurality of radially outwardly protruded data-non-recording regions 5, wherein the number of the data-non-recording regions 5 are larger than that of the data-non-recording regions 5 of the disk D shown in FIG. 4.

In detail, the non-true-circular optical disk E has an outer peripheral configuration shaped such that an outer circumference edge of a hypothetical true-circle 1 corresponding to a true-circular optical disk 7 is cut in 36 degree phase difference. Thus, the optical disk E has a clamping region 3 having a center aperture 2, a ring-shaped data-recording region 4 formed outside the clamping region 3 and ten data-non-recording regions 5 radially outwardly protruded in 36 degree phase difference. In this embodiment too, the cut-out portions 8 are formed so as to remain the data-recording region 4.

The aforementioned each protruded data-non-recording region 5 has an inscribed outer peripheral edge which inwardly contacts the hypothetical true-circle 1 in a point. In this embodiment, as shown in FIG. 5, the ten inscribed outer peripheral edges inwardly contacting the hypothetical true-circle 1 constitute positioning points a, b, c, d, e, f, g, h, I, j.

The line segments connecting the adjacent positioning points a, b, c, d, e, f, A, h, I, j correspond to an equilateral ten sides polygon inwardly touching the hypothetical true-circle 1. Therefore, these positioning points a, b, c, d, e, f, g, h, I, j meet a geometrical positional relationship by which a rotational center O of the disk substrate coincides with the center so the hypothetical true-circle 1 and a movement of the rotational center O relative to the center of the hypothetical true-circle 1 is prevented in a state that the two inscribed outer peripheral edges internally touch the hypothetical true-circle 1. In other words, a total of a rotational-center-side interior angle (∠aob, ∠boc, ∠cod, ∠doe ∠eof, ∠fog ∠goh, ∠hoi, ∠ioj and ∠joa) of each triangle (Δaob, Δboc, Δcod, Δdoe, Δeof Δfog, Δgoh, Δhoi, Δioj and Δjoa) formed by segments connecting adjacent two positioning points and the rotational center O becomes 360 degrees. Furthermore, in other words, the adjacent two positioning points are positioned on the hypothetical true-circle 1 in a circumferential direction thereof at arcuate intervals ab, bc, cd, de, ef, fg, gh, hi, ij, ja each not exceeding a half circumference length of the hypothetical true-circle.

Therefore, the non-true-circular optical disk E according to this embodiment can be centered in a circular dented portion of a disk carrying tray of a disk driver (not shown) by simply placing the disk E in the dented portion. Furthermore, in this state, the disk E is never shifted from the center of the disk carrying tray snot shown), Accordingly, the clamping of the non-true-circular optical disk E by a disk driver can be performed correctly.

The non-true-circular optical disk E is formed to be symmetric with respect to a straight line connecting any one of positioning points with the rotational center O, as well as symmetric with respect to the rotating center O, resulting in an excellent weight balance. Therefore, the disk E can also be suitably used as a CD-ROM of a high-speed reading type.

Figure 6:
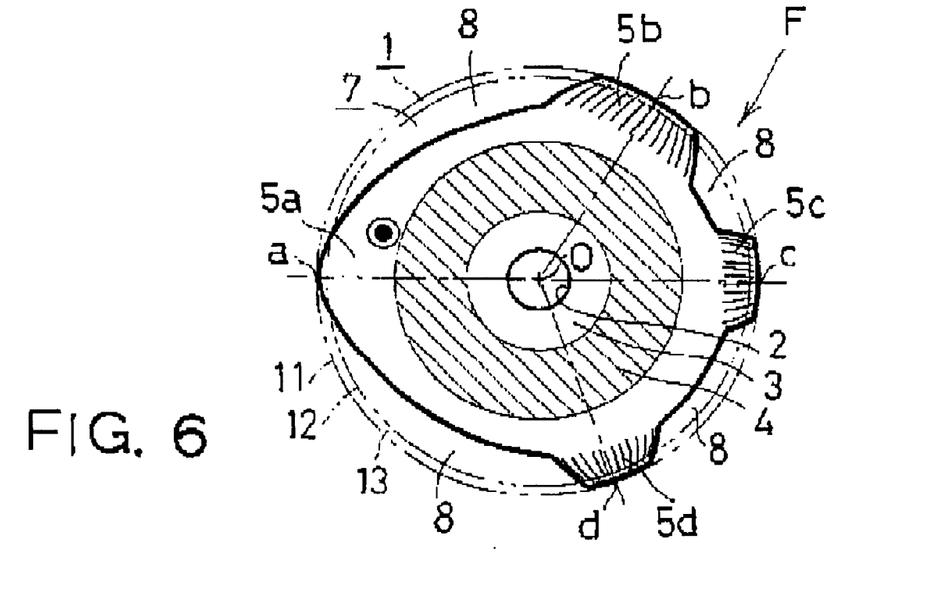
FIG. 6 is a plan view showing a non-true-circular optical disk having a fish-like configuration according to a sixth embodiment of the present inventions

FIG. 6 shows a non-true-circular optical disk F according to a sixth embodiment of the present invention.

Contrary to each of the aforementioned non-true-circular optical disks A, B, C, D, E each formed to have a geometrical configuration, the non-true-circular optical disk F according to the sixth embodiment as shown in FIG. 6 is formed to hare a contour imitating a fish-shape, by which an interesting original design is provided.

In detail, the non-true-circular optical disk F has a ring-shaped clamping region 3 having a center aperture 2, a ring-shaped data-recording region 4 formed outside the clamping region 3 and four data-non-recording regions 5 radially outwardly protruded from the data-recording region 4 imitating a fish head, a dorsal fin, a tail fin and a pelvic fin, respectively. In this embodiment too, the cut-out portions 8 are formed so as to remain the data-recording region 4.

The aforementioned each protruded data-non-recording region 5a, 5b, 5c, 5d has an inscribed outer peripheral edge which inwardly contacts the hypothetical true-circle 1. In this embodiment, as shown in FIG. 6, a total of four points a, b, c, d, namely, the intersection a of the data-non-recording region 5a imitating the fish head and the hypothetical true-circle 1, any one point b on the inscribed outer peripheral edge of the data-non-recording region 5b imitating the dorsal fin, any one point c on the inscribed outer peripheral edge of the data-non-recording region 5c imitating the tail fin, and any one point d on the inscribed outer peripheral edge of the data-non-recording region 5d imitating the pelvic fin, constitute positioning points a, b, c, d.

These positioning points a, b, c, d meet a geometrical positional relationship by which a rotational center O of the disk substrate coincides with the center of the hypothetical true-circle 1 and a movement of the rotational center O relative to the center of the hypothetical true-circle 1 is prevented in a state that these inscribed outer peripheral edges internally contact the hypothetical true-circle 1. In other words, a total of a rotational-center-side interior angle (∠aob, ∠boc ∠cod and ∠doa) of each triangle (Δaob, Δboc, Δcod, Δdoa) formed by segments connecting adjacent two positioning points and the rotational center O becomes 360 degrees, Furthermore, in other words, the adjacent two positioning points are positioned on the hypothetical true-circle 1 in a circumferential direction thereof at arcuate intervals ab, bc, cd, da each not exceeding a half circumference length of the hypothetical true-circle.

Therefore, the non-true-circular optical disk F according to this embodiment can be centered in a circular dented portion of a disk carrying tray of a disk driver (not shown) by simply placing the disk F in the dented portion. Furthermore, in this state, the disk F is never shifted from the center of the disk carrying tray (not shown). Accordingly, the clamping of the non-true-circular optical disk F by a disk driver can be performed correctly.

In this embodiment, the positioning points, which meet a geometrical positional relationship by which a rotational center O of the disk substrate coincides with the center of the hypothetical true-circle 1 and a movement of the rotational center O relative to the center of the hypothetical true-circle 1 is prevented in a state that these inscribed outer peripheral edges internally contact the hypothetical true-circle 1, do not necessarily require all the aforementioned points a, b, c, d. For examples even if the data-non-recording region 5b imitating the dorsal fin and the data-non-recording region 5d imitating the pelvic fin do not inwardly contact the hypothetical true-circle 1, the remaining positioning points a, c meet the aforementioned geometrical positional relationships Furthermore, even it the non-recording region 5c imitating the tail fin does not inwardly contact the hypothetical true-circle 1, the remaining positioning points a, b, d meet the aforementioned geometrical positional relationship.

Therefore, the aforementioned modified non-true-circular optical disk can also be centered in a circular dented portion of a disk carrying tray of a disk driver (not shown) by simply placing the disk in the dented portion. Furthermore, in this state, the disk is never shifted from the center of the disk carrying tray (not shown). Accordingly, the clamping of the non-true-circular optical disk by a disk driver can be performed correctly.

Figure 7:
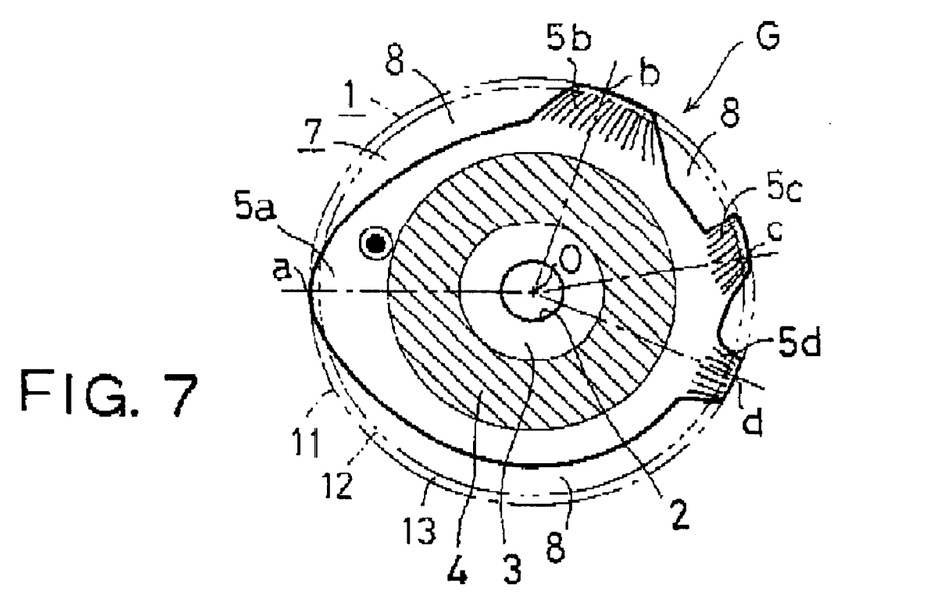
FIG. 7 is a plan view showing a modification of the non-true-circular optical disk shown in FIG. 6 according to a seventh embodiment of the present invention.

FIG. 7 shows a non-true-circular optical disk G according to a seventh embodiment of the present invention.

This non-true-circular optical disk G is a modification of the non-true-circular optical disk F shown in FIG. 6. The differences between the disk F and the disk G reside in the configuration and position of the data-non-recording region 5c imitating the tail fin and the position of the data-non-recording region 5d imitating the pelvic fin. The remaining portions are the same as in the sixth embodiment.

In the embodiment shown in FIG. 71 the data-non-recording region 5a imitating the fish head, the data-non-recording region 5b imitating the dorsal fin and the data-non-recording region 5c imitating the tail fin are located at the upper half of the hypothetical true-circle 1. On the other hand, the data-non-recording region 5d imitating the pelvic fin is located at the lower half of the hypothetical true-circle 1.

In this embodiment, as shown in FIG. 7, a total of four points a, b, c, d, namely, the intersection a of the data-non-recording region 5a imitating the fish head and the hypothetical true-circle 1, any one point b on the inscribed outer peripheral edge of the data-non-recording region 5b imitating the dorsal fin, any one point c of the inscribed outer peripheral edge of the data-non-recording region 5c imitating the tail fin, and any one point d on the inscribed outer peripheral edge of the data-non-recording region 5d imitating the pelvic fin, constitute positioning points a, b, c, d.

Similar to the embodiment shown in FIG. 6, these positioning points a, b, c, d meet a geometrical positional relationship by which a rotational center O of the disk substrate coincides with the center of the hypothetical true-circle 1 and a movement of the rotational center O relative to the center of the hypothetical true-circle 1 is prevented in a state that these inscribed outer peripheral edges internally contact the hypothetical true-circle 1.

Therefore, the non-true-circular optical disk G according to this embodiment can also be centered in a circular dented portion of a disk carrying tray of a disk driver (not shown) by simply placing the disk in the dented portion. Furthermore, in this state, the disk G is never shifted from the center of the disk carrying tray (not shown). Accordingly, the clamping of the non-true-circular optical disk G by a disk driver can be performed correctly.

In the Meantime, for example, if the data-non-recording region 5d imitating the pelvic fin fails to contact the hypothetical true-circle 1, three positioning points a, b, c remain. In this case, these three positioning points a, b, C meet the geometrical positional relationship by which a rotational center O of the disk substrate coincides with the center of the hypothetical true-circle 1. However, they fail to meet the geometrical positional relationship by which a movement of the rotational center O relative to the center of the hypothetical true-circle 1 is prevented. In other words, a total of a rotational-center-side interior angle ($\angle$aob, $\angle$boc, $\angle$aoc) of each triangle ($\Delta$aob, $\Delta$boc, $\Delta$coa) formed by segments connecting adjacent two positioning points and the rotational center O does not become 360 degrees. Furthermore, in other words, the arcuate interval ca from the positioning point c to the positioning point a in a clockwise direction exceeds a half circumference length of the hypothetical true-circle 1. Therefore, in this modified case, the non-true-circular optical disk may be shifted from the centered position, especially when it is used for a disk driver equipped with a vertically disposed disk carrying tray.

As it is apparent from the above explanation, the non-true-circular optical disk according to the present invention should include a plurality of positioning points meeting a geometrical positional relationship by which a rotational center of the disk substrate coincides with a center of the hypothetical true-circle and a movement of the rotational center relative to the center of the hypothetical true-circle is prevented in a state that the at least one inscribed outer peripheral edge internally touches the hypothetical true-circle.

The non-true-circular optical disk according to the present invention can be used in a general type player as well as a tray type player.

The present invention claims a priority based on Japanese Patent Application No. 11-92399 filed on Mar. 31, 1999, the content of which is incorporated hereinto by reference in its entirety.

The terms and descriptions in this specification are used only for explanatory purposes and the present invention is not limited to these, but many modifications and substitutions may be made without departing from the spirit of the scope of the present invention which is defined by the appended claims.

What is claimed is:

1. A non-true-circular optical disk, comprising:
a disk substrate which internally touches a hypothetical true-circle corresponding to an outer periphery of a true-circular optical disk of a certain standard size, said disk substrate having a non-true-circular contour corresponding to a configuration shaped such that at least one cut-out portion is formed at an outer periphery of the hypothetical true-circle to thereby enhance a design,
wherein said disk substrate includes at least one inscribed outer peripheral edge internally touching the hypothetical true-circle, and
wherein said at least one inscribed outer peripheral edge includes a plurality of positioning points meeting a geometrical positional relationship by which a rotational center of said disk substrate coincides with a center of the hypothetical true-circle and a movement of said rotational center relative to the center of the hypothetical true-circle is prevented in a state that said at least one inscribed outer peripheral edge internally touches the hypothetical true-circle.

2. The non-true-circular optical disk as recited in claim 1, wherein said at least one cut-out portion is formed at an inside region beyond a narrow outermost transparent region with no reflection layer generally provided at the true-circular optical disk.

3. The non-true-circular optical disk as recited in claim 1, wherein said disk substrate includes two inscribed outer peripheral edges, and wherein said positioning points are defined two intersections of a straight line passing on said rotational center and said two inscribed outer peripheral edges.

4. The non-true-circular optical disk as recited in claim 3, wherein each of said two inscribed outer peripheral edges inwardly contacts the hypothetical true-circle at a point.

5. The non-true-circular optical disk as recited in claim 3, wherein each of said two inscribed outer peripheral edges inwardly contacts the hypothetical true-circle in a line.

6. The non-true-circular optical disk as recited in claim 1, wherein said disk substrate includes a ring-shaped data-recording region located within a circle with its center at said rotating center and with a prescribed radius and a pair of data-non-recording regions radially outwardly extending from said data-recording region in opposite directions.

7. The non-true-circular optical disk as recited in claim 6, wherein said data-non-recording regions are formed so as to have the same shape and scale, respectively.

8. The non-true-circular optical disk as recited in claim 6, wherein said data-non-recording regions are formed to be symmetric with respect to a straight line passing on said rotating center.

9. The non-true-circular optical disk as recited in claim 1, wherein said cut-out portion is formed at at least one side of a straight line passing on said rotating center.

10. The non-true-circular optical disk as recited in claim 1, wherein said disk substrate includes three or more inscribed outer peripheral edges internally contacting the hypothetical circle, wherein said three or more inscribed outer peripheral edges include three or more positioning points, and wherein said three or more positioning points are positioned such that a total of a rotational-center-side interior angle of each triangle formed by segments connecting adjacent two positioning points and said rotational center becomes 360 degrees.

11. The non-true-circular optical disk as recited in claim 10, wherein each of said three or more inscribed outer peripheral edges inwardly contacts the hypothetical true-circle at a point.

12. The non-true-circular optical disk as recited in claim 10, wherein each of said three or more inscribed outer peripheral edges inwardly contacts the hypothetical true-circle in a line.

13. The non-true-circular optical disk as recited in claim 10, wherein said disk substrate includes a ring-shaped data-recording region located within a circle with its center at said rotating center and with a prescribed radius and a plurality of data-non-recording regions radially outwardly extending from said data-recording region.

14. The non-true-circular optical disk as recited in claim 13, wherein said data-non-recording regions are formed so as to have the same shape and scale, respectively.

15. The non-true-circular optical disk as recited in claim 13, wherein said data-non-recording regions are formed to be symmetric with respect to a straight line passing on said rotating center.

16. The non-true-circular optical disk as recited in claim 13, wherein said data-non-recording regions are formed to be symmetric with respect to said rotating said rotating center.

17. The non-true-circular optical disk as recited in claim 1, wherein said disk substrate includes three or more inscribed outer peripheral edges internally contacting the hypothetical circle, wherein said three or more inscribed outer peripheral edges include three or more positioning points, and wherein said three or more positioning points are positioned such that adjacent two positioning points are positioned on the hypothetical true-circle in a circumferential direction thereof at arcuate intervals each not exceeding a half circumference length of the hypothetical true-circle.

18. The non-true-circular optical disk as recited in claim 17, wherein each of said three or more inscribed outer peripheral edges inwardly contacts the hypothetical true-circle at a point.

19. The non-true-circular optical disk as recited in claim 17, wherein each of said three or more inscribed outer peripheral edges inwardly contacts the hypothetical true-circle at a line.

20. The non-true-circular optical disk as recited in claim 17, wherein said disk substrate includes a ring-shaped data-recording region located within a circle with its center at said rotating center and with a prescribed radius and a plurality of data-non-recording regions radially outwardly extending from said data-recording region.

21. The non-true-circular optical disk as recited in claim 20, wherein said data non-recording regions are formed so as to have the same shape and scale, respectively.

22. The non-true-circular optical disk as recited in claim 20, wherein said data non-recording regions are formed to be symmetric with respect to a straight line passing on said rotating center.

23. The non-true-circular optical disk as recited in clam 20, wherein said data non-recording regions are formed to be symmetric with respect to said rotating center.

* * * * *